UNITED STATES PATENT OFFICE 2,032,033

ACID TRIPHENYLMETHANE DYESTUFFS AND A PROCESS OF PREPARING THEM

Paul Wolff, Frankfort-on-the-Main-Hochst, Germany, assignor to General Aniline Works, Inc., New York, N. Y., a corporation of Delaware No Drawing. Application September 18, 1933, Serial No. 690,030. In Germany September 29, 1932

8 Claims. (Cl. 260—48)

The present invention relates to acid triphenylmethane dyestuffs and to a process of preparing them.

I have found that acid triphenylmethane dyestuffs of very good fastness to light, clear tint and good color in artificial light are obtainable by a process which comprises condensing a compound of the general formula:

wherein X represents halogen or an alkoxy group, with an indole compound which is substituted in alpha-position by alkyl, aralkyl or aryl, heating the compounds thus obtained of the general formula:

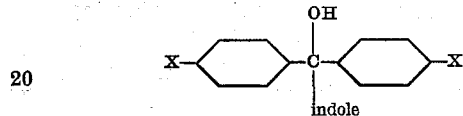

wherein X has the above meaning and indole represents the alpha-substituted indole radical which is bound to the central C-atom in beta-position, with a primary aromatic amine of the general formula:

NH₂-aryl-alkoxy the alkoxy group standing in para-position to the NH₂-group, and finally sulfonating the product thus obtained.

The dyestuffs thus obtained are new; for instance, dyestuffs are obtained which correspond to the following general probable formula:

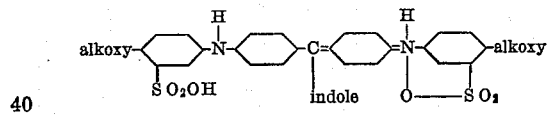

wherein indole represents an indole radical which is bound to the central C-atom in beta-position and which is substituted in alpha-position by alkyl, aralkyl or aryl.

The following examples serve to illustrate the invention, but they are not intended to limit it thereto, the parts being by weight:

(1) 25 parts of 4,4'-dichloro-benzophenone are condensed with 22 parts of N-methyl-alpha-phenylindole in the presence of 20 parts of phosphorus oxychloride by boiling for several hours in 100 parts of toluene. After distillation of the toluene and the phosphorus oxychloride still present the condensation product is melted at 120° C. for 4 hours with 60 parts of para-phenetidine. After cooling, the excess of para-phenetidine is removed from the melt, while stirring, with dilute hydrochloric acid wherein the blue basic dyestuff thus formed is insoluble. After drying, the dyestuff is sulfonated with sulfuric acid. There is obtained an acid dyestuff which has the following constitution:

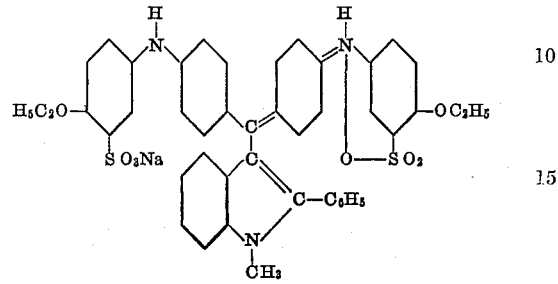

dyeing in the form of its sodium salt wool and silk bright blue tints of very good fastness to light and good color in artificial light.

(2) 25 parts of 4,4'-dichloro-benzophenone are condensed with 26 parts of N-n-butyl-alpha-phenylindole in the presence of 20 parts of phosphorus oxychloride in 100 parts of toluene, as stated in Example 1. The condensation product is melted with para-phenetidine in the same manner as stated in Example 1, and the water-insoluble blue basic dyestuff thus obtained is isolated and sulfonated with sulfuric acid. There is obtained a blue acid dyestuff which has the following constitution:

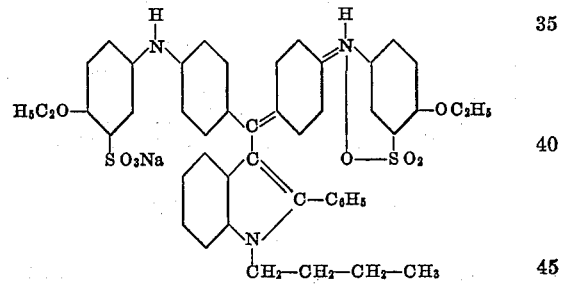

dyeing wool and silk clear blue tints of a somewhat more red shade than that of the dyestuff described in Example 1 and having the same good properties.

(3) 24 parts of 4,4'-dimethoxy-benzophenone are condensed with 24 parts of Bz-2-methyl-N-ethyl-alpha-phenylindole as described in Examples 1 and 2. The condensation product is melted with para-phenetidine in the same manner as stated in Example 1. The water-insoluble blue dyestuff thus obtained is isolated and sulfonated with sulfuric acid. There is obtained a blue acid dyestuff which has the following constitution:

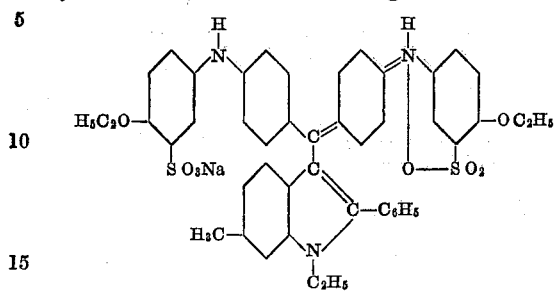

dyeing in the form of its sodium salt wool and silk bright greenish-blue tints of very good fastness to light and good color in artificial light.

By using instead of 4,4'-dimethoxy-benzophenone another alkoxy compound as, for instance, 4,4'-diethoxy-benzophenone, the process may be carried out in the same manner.

(4) 25 parts of 4,4'-dichloro-benzophenone are condensed with 24 parts of Bz-3-methyl-N-ethyl-alpha-phenylindole as stated in the preceding examples. The condensation product is melted with 60 parts of para-anisidine. The excess of para-anisidine is removed by means of dilute hydrochloric acid and a basic, water-insoluble blue dyestuff is obtained. After sulfonating it with sulfuric acid, there is obtained an acid blue dyestuff which has the following constitution:

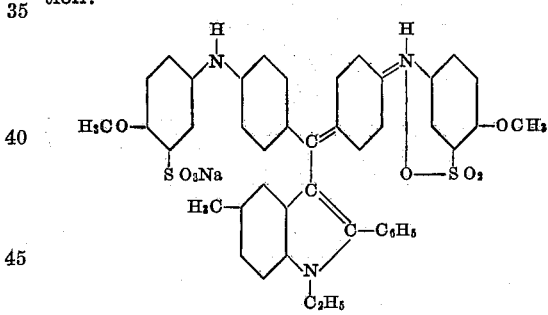

dyeing in the form of its sodium salt wool and silk clear blue tints similar to those of the dyestuff described in Example 3 and of the same good properties.

(5) 25 parts of 4,4'-dichloro-benzophenone are condensed with 26 parts of Bz-3-chloro-N-ethyl-alpha-phenylindole as described in Example 1. The condensation product is melted with para-phenetidine and the water-insoluble blue basic dyestuff thus obtained is sulfonated with sulfuric acid. There is obtained a blue acid dyestuff which has the following constitution:

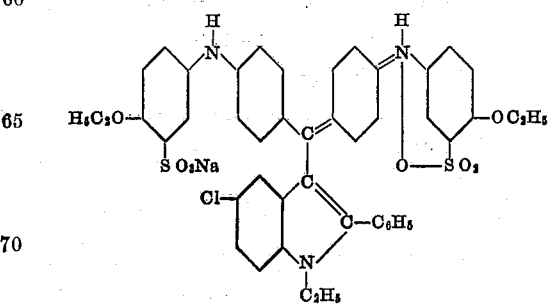

dyeing in the form of its sodium salt wool and silk clear blue tints similar to those of the dyestuff described in Example 1 and of the same good properties.

(6) 25 parts of 4,4'-dichloro-benzophenone are condensed with 15 parts of N-methyl-alpha-methylindole as stated in the preceding examples. The condensation product is melted at about 120° C. with 60 parts of para-phenetidine. The excess of phenetidine is removed and a water-insoluble blue dyestuff is obtained. After sulfonating it and isolating it in the form of its sodium salt there is obtained a dyestuff which dyes wool and silk clear blue tints of a somewhat more red shade than that of the dyestuff described in Example 1.

By using instead of N-methyl-alpha-methylindole N-methyl-alpha-benzylindole there is obtained a blue dyestuff having similar properties.

(7) 25 parts of 4,4'-dichlorobenzophenone are condensed with 31 parts of N-isobutyl-Bz-2,4-dimethyl-alpha-(parachlorophenyl)-indole in the presence of 20 parts of phosphorus oxychloride by boiling for several hours in 100 parts of toluene. After distillation of the toluene and the phosphorus oxychloride still present, the condensation product is melted at 120° C. for 4 hours with 60 parts of para-phenetidine. After cooling, the excess of the para-phenetidine is removed from the melt, while stirring, with dilute hydrochloric acid wherein the blue basic dyestuff thus formed is insoluble. After drying, the dyestuff is sulfonated with sulfuric acid. There is obtained an acid dyestuff dyeing in the form of its sodium salt wool and silk bright greenish-blue tints of a very good fastness to light and especially of a good color in artificial light.

I claim:
1. The process which comprises condensing a compound of the general formula:

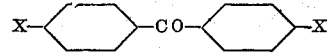

wherein X represents halogen or an alkoxy group, with an indole compound which is substituted in alpha-position by methyl, benzyl or an aryl group of the benzene series, heating the compounds thus obtained of the general formula:

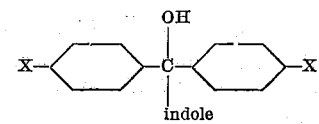

wherein X has the above meaning and indole represents the alpha-substituted indole radical which is bound to the central C-atom in beta-position, with a primary aromatic amine of the benzene series containing an alkoxy group in para-position to the NH₂-group, and finally sulfonating the product thus obtained.

2. The process which comprises boiling for about 2 to about 5 hours in toluene 4,4'-dichlorobenzophenone and N-methyl-alpha-phenylindole in the presence of phosphorus oxychloride, melting the condensation product thus obtained of the following formula:

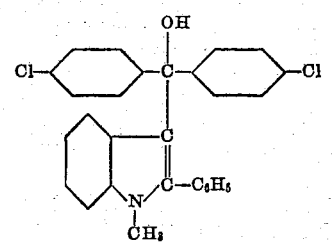

with para-phenetidine for 4 hours at about 120° C. and sulfonating the product thus obtained of the following formula:

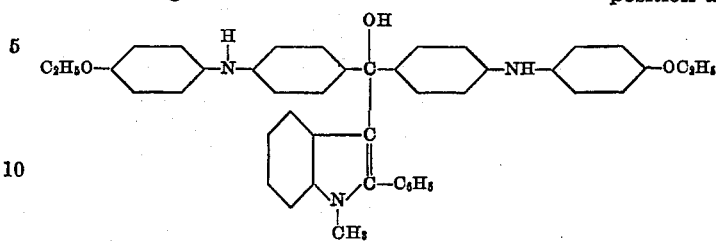

3. The process which comprises boiling for about 2 to about 5 hours in toluene 4.4'-dichlorobenzophenone and N-n-butyl-alpha-phenyl-indole in the presence of phosphorus oxychloride, melting the condensation product thus obtained of the following formula:

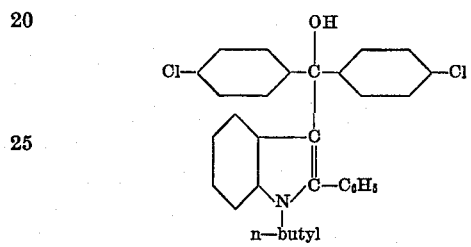

with para-phenetidine for 4 hours at about 120° C. and sulfonating the product thus obtained of the following formula:

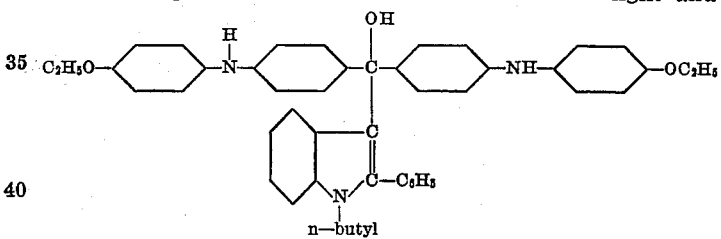

4. The process which comprises boiling for about 2 to about 5 hours in toluene 4.4'-dimethoxy-benzophenone and Bz-2-methyl-N-ethyl-alpha-phenylindole in the presence of phosphorus oxychloride, melting the condensation product thus obtained of the following formula:

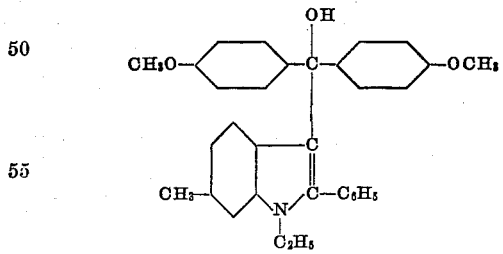

with para-phenetidine for 4 hours at about 120° C. and sulfonating the product thus obtained of the following formula:

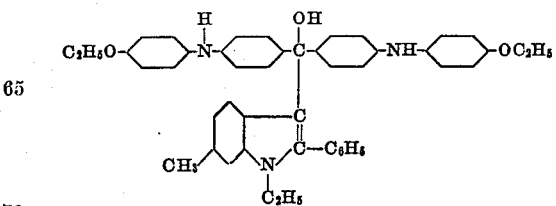

5. The compounds of the formula:

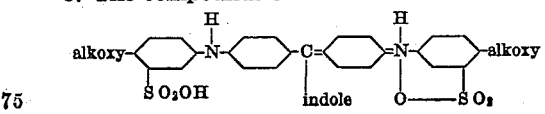

wherein indole represents an indole radical which is bound to the central C-atom in beta-position and which is substituted in alpha-position by methyl, benzyl or an aryl group of the benzene series, being dyestuffs of a very good fastness to light, a clear tint and good color in artificial light.

6. The compound of the formula:

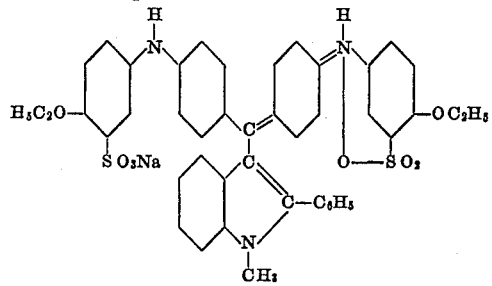

dyeing in the form of its sodium salt wool and silk bright blue tints of very good fastness to light and good color in artificial light.

7. The compound of the formula:

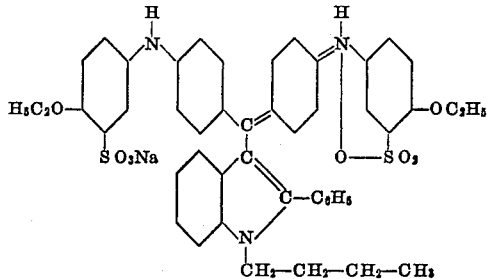

dyeing in the form of its sodium salt wool and silk clear blue tints of very good fastness to light and good color in artificial light.

8. The compound of the formula:

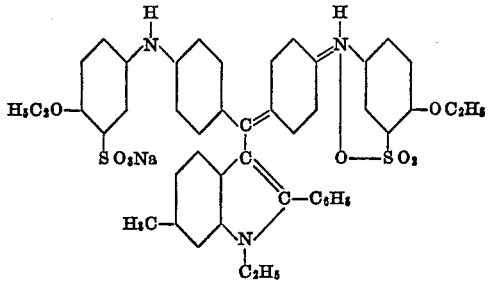

dyeing in the form of its sodium salt wool and silk bright greenish-blue tints of a very good fastness to light and a good color in artificial light.

PAUL WOLFF.